(12) United States Patent
Marcoux et al.

(10) Patent No.: US 7,209,492 B2
(45) Date of Patent: Apr. 24, 2007

(54) DSO TIMING SOURCE TRANSIENT COMPENSATION

(75) Inventors: Matthew J. Marcoux, Plano, TX (US); Robert S. Gammenthaler, Jr., Frisco, TX (US)

(73) Assignee: Alcatel, Paris (FR)

(*) Notice: Subject to any disclaimer, the term of this patent is extended or adjusted under 35 U.S.C. 154(b) by 1073 days.

(21) Appl. No.: 10/122,461

(22) Filed: Apr. 15, 2002

(65) Prior Publication Data

US 2004/0008696 A1   Jan. 15, 2004

(51) Int. Cl.
*H04J 3/06* (2006.01)

(52) U.S. Cl. ...................... 370/503; 370/518
(58) Field of Classification Search ................ 370/470, 370/471, 503, 504, 505, 506, 509, 510, 512, 370/518, 516
See application file for complete search history.

(56) References Cited

U.S. PATENT DOCUMENTS

| | | | |
|---|---|---|---|
| 4,228,496 A | 10/1980 | Katzman et al. | |
| 4,389,720 A | 6/1983 | Baxter et al. | |
| 4,495,614 A | 1/1985 | Aro et al. | |
| 5,315,488 A | 5/1994 | Le Gallo et al. | |
| 5,367,520 A | 11/1994 | Cordell | |
| 5,499,341 A | 3/1996 | Wilson et al. | |
| 5,515,515 A | 5/1996 | Kennedy et al. | |
| 5,526,349 A | 6/1996 | Diaz et al. | |
| 5,668,484 A | 9/1997 | Nomura | |
| 5,734,685 A | 3/1998 | Bedell | |
| 5,740,211 A | 4/1998 | Bedrosian | |
| 5,812,618 A | 9/1998 | Muntz | |
| 5,812,882 A | 9/1998 | Raji et al. | |
| 5,896,427 A | 4/1999 | Muntz et al. | |
| 6,000,020 A | 12/1999 | Chin et al. | |

(Continued)

FOREIGN PATENT DOCUMENTS

EP   0674274 A   9/1995

OTHER PUBLICATIONS

Force Computers, "Compact vs Industrial PC's", Jan. 1997 pp. 1-19.

(Continued)

*Primary Examiner*—Brenda Pham
(74) *Attorney, Agent, or Firm*—Danamraj & Youst; Jessica W. Smith; V. Lawrence Sewell

(57) ABSTRACT

System and method for compensating for DS0 timing source transients, such as may occur during a switchover to a new external reference, is described. In one embodiment, an SFI control signal is monitored for embedded frame position information. When the frame position information is initially detected, a 10-bit frame clock counter is reset to zero. The counter is then incremented using an 8.192 MHz clock. From that point on, each time the SFI frame position information is detected, the value of the frame clock counter is checked. If the counter value is zero, the counter continues to run freely. If the counter value is non-zero and the most significant bit ("MSB") thereof is zero, the count of the frame clock counter is held for one clock period. If the counter value is non-zero and the MSB thereof is one, the count of the frame clock counter is advanced by a value of two, rather than one, for one clock period.

23 Claims, 11 Drawing Sheets

U.S. PATENT DOCUMENTS

| | | |
|---|---|---|
| 6,002,683 A | 12/1999 | Madonna |
| 6,009,468 A | 12/1999 | Lau et al. |
| 6,014,319 A | 1/2000 | Kuchta et al. |
| 6,018,456 A | 1/2000 | Young et al. |
| 6,018,529 A | 1/2000 | Toth |
| 6,041,066 A | 3/2000 | Meki et al. |
| 6,112,276 A | 8/2000 | Hunt et al. |
| 6,167,062 A | 12/2000 | Hershey et al. |
| 6,198,753 B1 | 3/2001 | Virdee et al. |
| 6,229,822 B1 | 5/2001 | Chow et al. |
| 6,240,087 B1 | 5/2001 | Cummings et al. |
| 6,243,369 B1 * | 6/2001 | Grimwood et al. ......... 370/335 |
| 6,269,081 B1 | 7/2001 | Chow et al. |
| 6,282,599 B1 | 8/2001 | Gallick et al. |
| 6,285,673 B1 | 9/2001 | Blackburn et al. |
| 6,289,376 B1 | 9/2001 | Taylor et al. |
| 6,293,636 B1 | 9/2001 | Le et al. |
| 6,363,452 B1 | 3/2002 | Lach |
| 6,389,499 B1 | 5/2002 | Frank et al. |
| 6,397,374 B1 | 5/2002 | Pasqualini |
| 6,409,542 B1 | 6/2002 | Ivey, Jr. et al. |
| 6,717,940 B1 | 4/2004 | McGrew |
| 6,736,016 B1 | 5/2004 | Tong et al. |
| 6,771,670 B1 * | 8/2004 | Pfahler et al. .............. 370/503 |

OTHER PUBLICATIONS

Fischer, Wayne, "Compact PCI-Next Generation Bus Architecture", Feb. 1998, pp. 106-109.

PCT Industrial Computers, "Compact PCI Specification" Oct. 1999, pp. 9-61.

"Broadband STP Planner", Network Signaling Solutions, Nortel Networks, Issue 1, Dec. 1998.

* cited by examiner

DS0 TIMING SOURCE TRANSIENT COMPENSATION

CROSS-REFERENCE TO RELATED APPLICATION(S)

This application discloses subject matter related to the subject matter disclosed in the following commonly owned, co-pending patent applications, which are hereby incorporated by reference in their entireties: (1) U.S. patent application Ser. No. 09/540,308, entitled "METHOD AND APPARATUS FOR ROUTING ALARM SIGNALS IN A SIGNALING SERVER", filed Mar. 31, 2000 in the name(s) of: Val Teodorescu; (2) U.S. patent application Ser. No. 09/541,002, entitled "CLOCK DISTRIBUTION SCHEME IN A SIGNALING SERVER", filed Mar. 31, 2000 in the name(s) of: Val Teodorescu; (3) U.S. patent application Ser. No. 09/540,591, entitled "BUS CONTROL MODULE FOR A MULTI-STAGE CLOCK DISTRIBUTION SCHEME IN A SIGNALING SERVER", filed Mar. 31, 2000 in the name(s) of: Serge Fourcand, Curt McKinley, and Val Teodorescu; (4) U.S. patent application Ser. No. 10/122,506, entitled "METHOD AND SYSTEM FOR EMBEDDING A FIRST CLOCK SIGNAL PHASE WITHIN A SECOND SIGNAL", filed Apr. 15, 2002 in the name(s) of: John H. Bond, Robert S. Gammenthaler, Jr., and James C. McKinley; and (5) U.S. patent application Ser. No. 09/593,362, entitled "METHOD AND SYSTEM FOR GENERATING A TIMING SIGNAL", filed Mar. 31, 2000 in the name(s) of: John Bond and Teodorescu.

BACKGROUND OF THE INVENTION

1. Technical Field of the Invention

The present invention generally relates to clock distribution techniques in telecommunications equipment. More particularly, and not by way of any limitation, the present invention is directed to a system and method of compensating for timing source transients in connection with DS0 telecommunications links.

2. Description of Related Art

For error-free transmission of DS0 data between two telecommunications devices located at a site, industry standards require that the data transmission circuitry of each device use a raw, unfiltered, 64 KHz composite clock signal from a building integrated timing source ("BITS") to define the data bit edges. Since each DS0 device uses this clock to recover data received from other DS0 devices, each DS0 device's transmit data must be appropriately aligned to the composite clock's 8 KHz frame. Furthermore, the device's central clock must not filter the composite clock wander and transients, but must follow them so that clock-to-data skew is minimized at the devices. On the other hand, if this same unfiltered clock signal is used to transmit data to or operate non-DS0 circuitry within other devices, the erratic nature of the composite clock can cause timing hazards and corrupt data in those circuits.

It is possible that a single system will include circuitry having different timing requirements. For example, a signaling server such as that described in the above-noted U.S. patent application Ser. No. 09/541,002, entitled "CLOCK DISTRIBUTION SCHEME IN A SIGNALING SERVER", may accommodate both phase-dependent (e.g., DS0) links as well as non-phase-dependent (e.g., DS1, T-1, SONET) links. This can be accomplished by providing within the system two separate timing distribution mechanisms, one for the phase-dependent links and an other for the non-phase-dependent links. Such duplication clearly adds complexity both to cabling and circuitry requirements of the system, as well as increasing the associated software overhead involved in configuring and monitoring the timing distribution mechanism. Moreover, increasingly stringent space-limitations on system packaging standards require that the number of signals and cables in a system be minimized.

An alternative means for enabling the timing requirements of both phase-dependent and non-phase-dependent links in the same system to be accommodated is disclosed in the above-noted related U.S. Patent Application, entitled METHOD AND SYSTEM FOR EMBEDDING A FIRST CLOCK SIGNAL PHASE WITHIN A SECOND SIGNAL, which has been incorporated by reference in its entirety. The combination of the techniques described in the referenced patent application results in the ability to implement a single generic timing distribution system in a telecommunications node that includes both phase-dependent and non-phase-dependent links.

It will be recognized that upper tier system disturbances may cause such a generic timing distribution system implemented in a telecommunications system to be forced to switch from one timing reference signal to a second timing reference signal. When such a timing switchover occurs, a temporary misalignment between the distributed DS0 data and the associated frame reference signals may occur. If such a misalignment is propagated from the timing distribution system to the DS0 link function, then transmission and reception of DS0 frames will be corrupted.

During normal operation, the generic timing distribution system referred to herein provides a 8.192 MHz clock, a 19.44 MHz clock, and a framed reference signal comprising a Super Frame Indicator ("SFI") signal to a plurality of line cards, including, for example, a DS0 interface module ("DIM") card. The SFI signal is transmitted using the 19.44 MHz clock. The 8.192 MHz clock and the 19.44 MHz clocks are aligned on 125 µs boundaries and are synchronized to an external timing reference from a Building Integrated Timing Source ("BITS"). As described in the above-noted U.S. patent application Ser. No. 09/541,002, entitled "CLOCK DISTRIBUTION SCHEME IN A SIGNALING SERVER", the SFI carries control information, including a link frame position indication, to downstream cards.

In particular, the SFI signal is a serially encoded framed control signal comprising a plurality of fields for controlling the proper distribution of clock signals and for transmitting commands to system modules. Accordingly, the SFI signal comprises timing and control information addressed to individual modules of a system. In one embodiment, the SFI signal comprises timeslots, each of which is assigned to a module. Each timeslot has a header, which may comprise a six-bit synchronization word. In order to provide synchronization, bits of the timeslot excluding the header may be repeated twice, so a module receiving the signal may synchronize itself by evaluating the synchronization word of the SFI signal. The SFI signal may include a phase of a timing signal, for example, a composite clock signal.

The SFI signal may include a signal selection command that instructs each module to select a specific derived clock signal from the signals received from the downstream modules and to send the selected derived clock signal upstream.

As previously noted, under certain conditions, the timing distribution system may determine that the external reference is no longer viable and a switchover to a new external reference will occur. During the switchover, the alignment between the 8.192 MHz and the 19.44 MHz clocks may be temporarily skewed. In order to continue the uninterrupted transmission and reception of DS0 traffic, the DS0 function must be able to compensate for this input reference skewing. Because this problem arises from the use of a single timing distribution mechanism for both DS0 and other links, the prior art suggests no solution to this problem.

SUMMARY OF THE INVENTION

Accordingly, the present invention advantageously provides a solution that compensates for DS0 timing source transients, such as may occur during a switchover to a new external reference. In one embodiment, an SFI control signal is monitored for embedded frame position information. When the frame position information is initially detected, a 10-bit frame clock counter is reset to zero. The counter is then incremented using an 8.192 MHz clock. From that point on, each time the SFI frame position information is detected, the value of the frame clock counter is checked. If the counter value is zero, indicating that the 19.44 MHz clock and the 8.192 MHz clock are in alignment, the counter continues to run freely.

However, if the counter value is non-zero and the most significant bit ("MSB") thereof is zero, then the SFI information was received late, implying that the DS0 frame must be "stretched" slightly. This is accomplished by holding the count of the frame clock counter for one clock. On the other hand, if the counter value is non-zero and the MSB thereof is one, then the SFI information was received early, implying that the DS0 frame must be "shortened" slightly. This is accomplished by advancing the count of the frame clock counter by a value of two, rather than one, for one clock.

In one aspect, the invention comprises a method of compensating for timing source transients caused by misalignment of first and second clock signals comprising the steps of monitoring a control signal transmitted using the second clock signal for frame position information for the first clock signal, determining whether the first and second clock signals are misaligned in response to detection of frame position information, and periodically temporarily altering one clock period of the first clock signal until the first and second signals are realigned in response to a determination that the first and second signals are misaligned.

In another aspect, the invention comprises a method of compensating for timing source transients caused by misalignment of first and second clock signals comprising monitoring a control signal transmitted using the second clock signal for frame position information for the first clock signal; responsive to detection of frame position information, resetting a counter to zero; causing the counter to increment using the first clock signal; continuing to monitor the control signal for frame position information; responsive to each subsequent detection of frame position information determining a value of the counter, if the value of the counter is non-zero and the most significant bit ("MSB") of the counter is zero, advancing the value of the counter by more than one count for one clock cycle, and if the value of the counter is non-zero and the MSB of the counter is non-zero, holding the value of the counter for at least one clock cycle.

In another aspect, the invention comprises a system for compensating for timing source transients caused by misalignment of first and second clock signals comprising means for monitoring a control signal transmitted using the second clock signal for frame position information for the first clock signal, means responsive to detection of frame position information for resetting a counter to zero, means for causing the counter to increment using the first clock signal, means for continuing to monitor the control signal for frame position information, means responsive to each subsequent detection of frame position information for determining a value of the counter, means responsive to a determination that the value of the counter is non-zero and the most significant bit ("MSB") of the counter is zero for advancing the value of the counter by more than one count for one clock cycle, and means responsive to a determination that the value of the counter is non-zero and the MSB of the counter is non-zero for holding the value of the counter for at least one clock cycle.

In another aspect, the invention comprises an apparatus for compensating for timing source transients caused by misalignment of first and second clock signals in a telecommunications signaling server comprising logic for monitoring a control signal transmitted using the second clock signal for frame position information for the first clock signal, a counter connected to the monitoring logic, and logic responsive to detection of frame position information for resetting the counter to zero, wherein, subsequent to the resetting, the counter increments using the first clock signal, wherein the monitoring logic continues to monitor the control signal for frame position information, and wherein responsive to each subsequent detection of frame position information by the monitoring logic, the monitoring logic determines a value of the counter and, if the value of the counter is non-zero and the most significant bit ("MSB") of the counter is zero, the value of the counter is advanced by more than one count for one clock cycle, and, if the value of the counter is non-zero and the MSB of the counter is non-zero, the value of the counter is held for at least one clock cycle.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
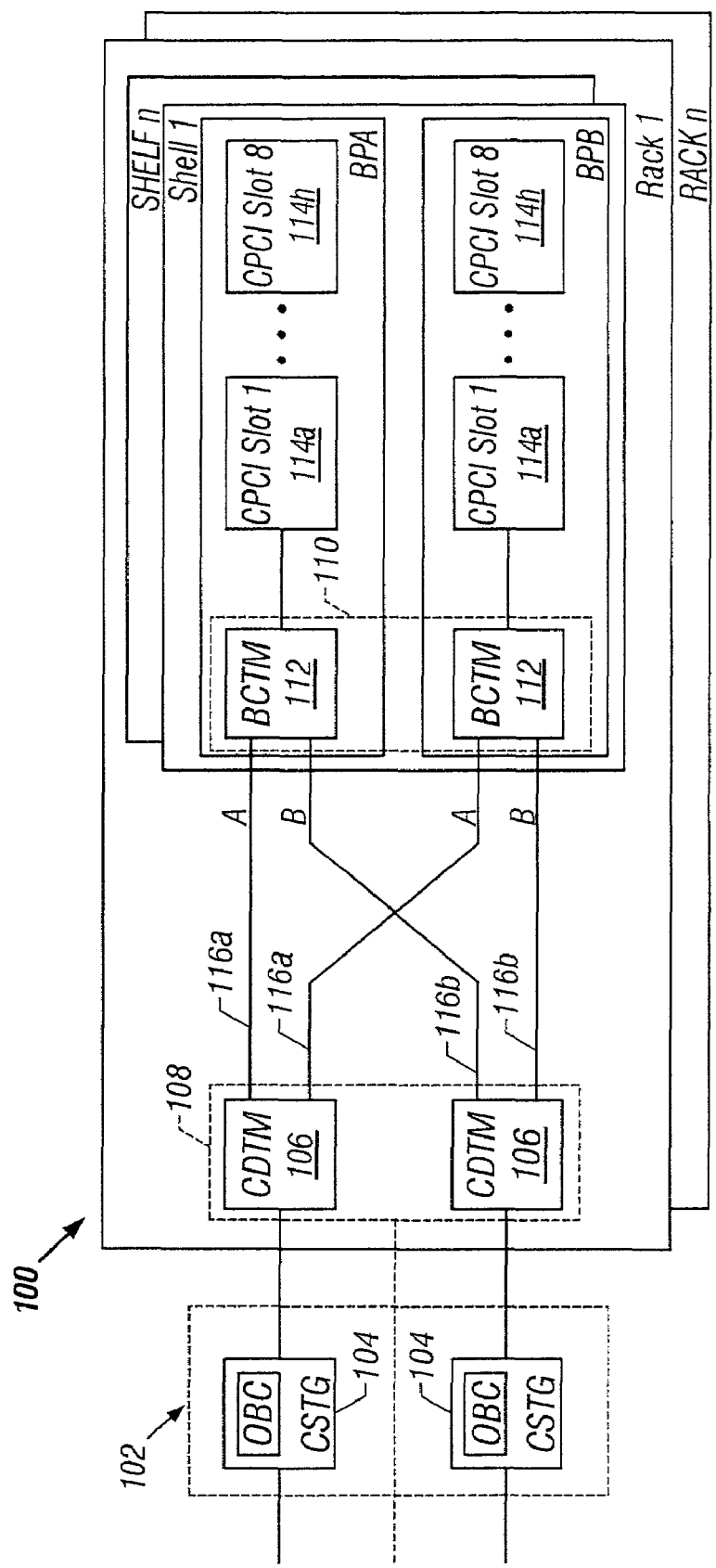
FIG. 1 is a block diagram of a timing distribution architecture for a signaling server in accordance with one embodiment.

In the drawings, like or similar elements are designated with identical reference numerals throughout the several views thereof, and the various elements depicted are not necessarily drawn to scale. FIG. 1 is a block diagram of a timing distribution architecture for a signaling server 100 in accordance with one embodiment. For ease of illustration, the system 100 is shown as being quipped with one rack. A first stage 102 of a three-stage clock distribution scheme comprises a pair (primary and secondary) of Compact System Timing Generators ("CSTGs") 104. The CSTGs 104 provide system clock and SFI signals to a pair of Clock Distribution Transition Modules ("CDTMs") 106 comprising a second stage 108 of the clock distribution scheme. As those of ordinary skill will readily recognize, the second stage 108 is provided in the exemplary embodiment as the lowest level CDTMs, i.e., the R-CDTMs, although it may comprise multiple levels of CDTMs depending on the size of the signaling server.

The CDTMs 106 are directly connected to a third stage 110 of the clock distribution mechanism comprised of Bus Control Transition Module ("BCTM") cards 112. Each of the BCTM cards 112 is responsible for local clock distribution with respect to eight Compact PCI slots 114a–114h residing in the half-shelf it controls. Additionally, each BCTM card 112 terminates two redundant timing distribution planes 116a and 116b received from the CDTMs 106. Additional details regarding architecture and functionality of the system 100 and elements thereof as shown and described with reference to FIG. 1 are set forth in the co-pending, commonly-assigned patent applications that have been cross-referenced herein above and are incorporated by reference herein.

Figure 2A:
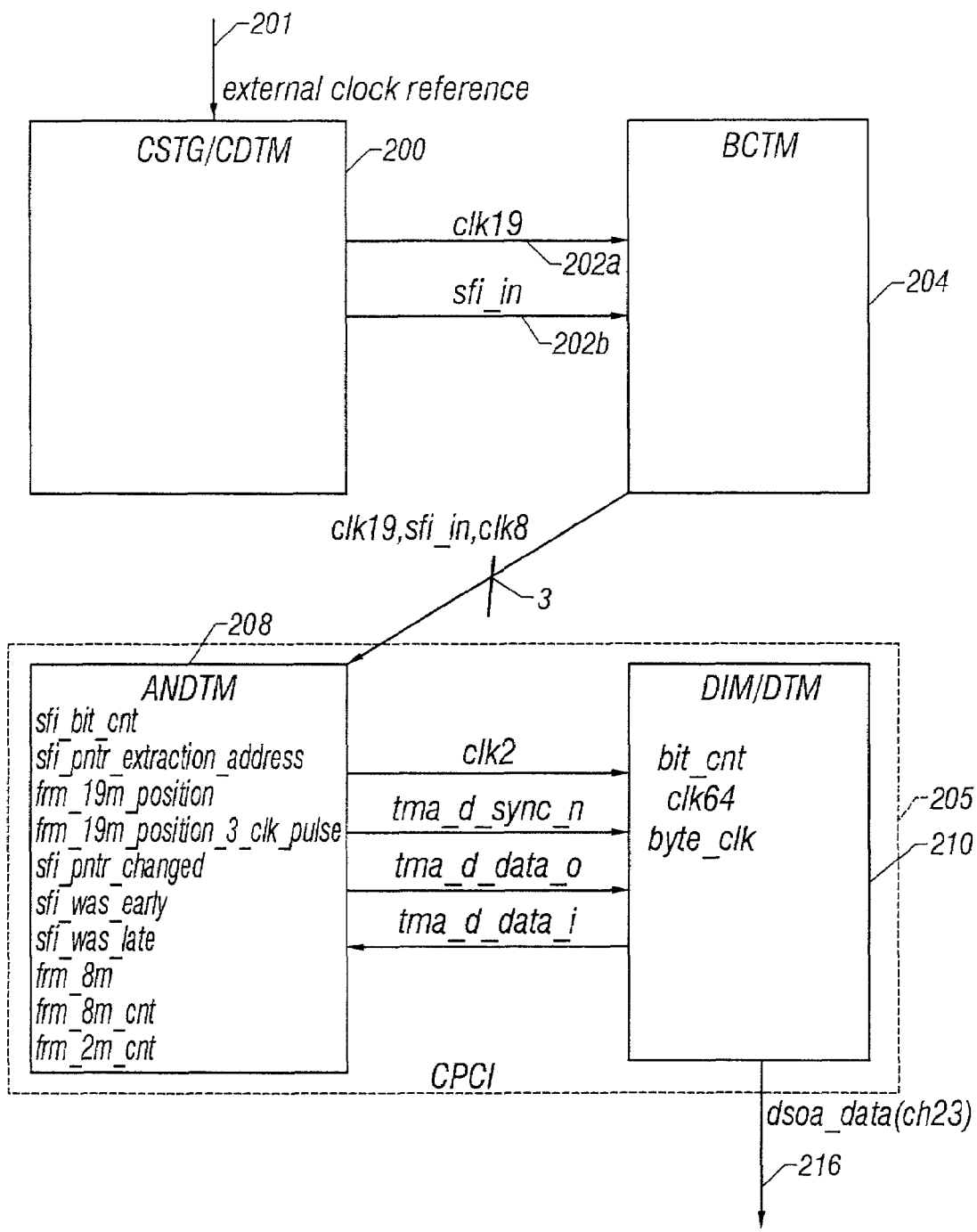
FIG. 2A is a simplified block diagram of a half rack of a signaling server similar to the server of FIG. 1.

FIG. 2A is a simplified block diagram of a half rack of a signaling server similar to the server 100 of FIG. 1. For the sake of simplicity, FIG. 2A illustrates only a single CSTG/CDTM combination, designated by a reference numeral 200. The CSTG/CDTM is connected to receive an external clock reference signal from an external source (not shown) via a line 201 and is also connected to provide a 19.44 MHz clock signal ("clk19") via a line 202a and an SFI signal ("sfi_in") via a line 202b to a BCTM 204. The BCTM 204 uses the 19.44 MHz clock signal and the SFI signal from the CSTG/CDTM 200 to generate an 8.192 MHz clock signal ("clk8") and provides all three signals to a Compact Peripheral Component Interconnect (CPCI) backplane system 205 comprising an Application Node DS0 Transition Module ("ANDTM") 208 and a DS0 Interface Module/DS0 Transition Module ("DIM/DTM") 210.

As will be described in greater detail below, the ANDTM 208 uses the three signals received from the BCTM (i.e., the 19.44 MHz clock signal, the SFI signal, and the 8.192 MHz clock signal) to generate a plurality of signals, pulses, and counters to implement the DS0 timing source transient compensation features of the present invention. In particular, the signals, pulses, and counters generated by the ANDTM enable appropriate adjustment (e.g., shortening or lengthening, as necessary) of the clock signal ("clk2") used to clock DS0 data, represented in FIG. 2A as a single channel of DS0 data ("dsoa_data(ch23)") out of the DIM/DTM 210 on a line 216.

Specifically, the ANDTM 208 includes a Field Programmable Gate Array ("FPGA") (not shown) for storing a plurality of status indicators, including an "sfi_bit_cnt", an "sfi_pntr_extraction_address", an "sfi_pntr_changed", an "sfi_was_early", and an "sfi_was_late". The ANDTM 208 also generates several internal signals/pulses ("frm_19m_position", "frm_19m_position_3_clk_pulse", and "frm_8m") and counters ("frm_8m_cnt" and "frm_2m_cnt") for use in generating signals ("clk2", "tma_d_sync_n", and "tma_d_data_o") to the DIM/DTM 210.

Similarly, the DIM/DTM 210 uses the signals received from the ANDTM 208 to generate internal signals ("byte_clk" and "clk64") and a counter ("bit_cnt") within an FPGA (not shown) of the DIM/DTM 210, as well as to generate multiplexed DS0 data to the ANDTM 208 ("tma_d_data_i").

Figure 2B:
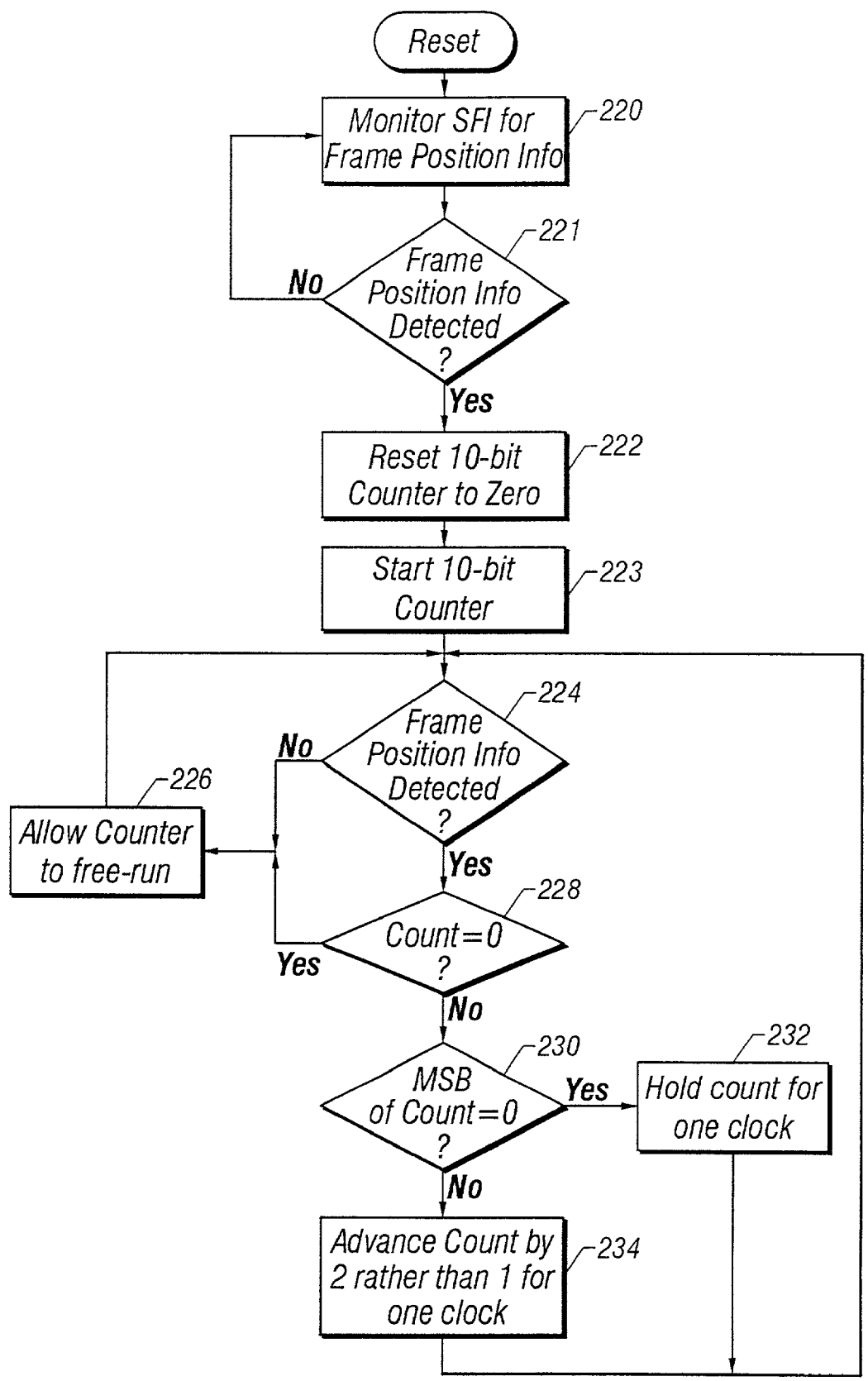
FIG. 2B is a flowchart of the operation of one embodiment of the present invention for performing DS0 timing source transient compensation.

FIG. 2B is a flowchart of the operation of one embodiment of the present invention for performing DS0 timing source transient compensation. As previously indicated, under certain conditions, the CSTG 200 may determine that the external reference is no longer viable and a switchover to a new external reference will occur. During the switchover, the alignment between the 8.192 MHz clock (clk8) and the 19.44 MHz clock (clk19) may be temporarily skewed. In order to continue the uninterrupted transmission and reception of DS0 traffic, the DIM/DTM 210 must be able to compensate for this input reference skewing. This is accomplished through use of a 10-bit frame clock counter, which in a preferred embodiment is implemented within the FPGA of the ANDTM 208.

Referring now to FIG. 2B, responsive to a RESET event, such as cycling of power to the system board or assertion of PCI reset to the ANDTM card slot (which would occur if the system is attempting to reinitialize the slot), in step 220, detection logic within the ANDTM 208 monitors the SFI signal ("sfi_in") to detect frame position information embedded therein. It should be noted that the occurrence of a RESET event at any point during operation as described with reference to FIG. 2B results in an immediate return to step 220. In step 221, a determination is made whether frame position information has been detected. If not, execution returns to step 220; otherwise, execution proceeds to step 222, in which the 10-bit frame clock counter is reset to zero. In step 223, the 10-bit frame clock counter begins to count up using the 8.192 MHz clock. In step 224, a determination is made whether SFI frame position information has been detected. If not, execution proceeds to step 226 and the 10-bit counter continues to run. When in step 224 it is determined that SFI frame position information has been detected, execution proceeds to step 228, in which a determination is made whether the value of the 10-bit counter is zero. If so, indicating that the 8.192 MHz and the 19.44 MHz clocks are still locked, execution returns again to step 226 and the 10-bit counter continues to free run.

If in step 228 it is determined that the value of the 10-bit counter is not equal to zero, execution proceeds to step 230, in which a determination is made whether the most significant bit ("MSB") of the 10-bit counter is equal to zero, indicating that the SFI frame position information was received late. If so, execution proceeds to step 232, in which the frame clock count is held (i.e., not advanced) for one clock. Otherwise, indicating that the SFI frame information was received early, execution proceeds to step 234, in which the frame clock count is advanced by two, rather than by one, for one clock. Execution then returns to step 224.

The halting and advancing of the 8.192 MHz frame clock count yields a single DS0 bit (64 kbps+15625 ns) per frame, which is lengthened or shortened by one 8.192 MHz clock period, or 122 ns. This is due to the fact that bit one of the 8.192 MHz frame clock count is used to generate the 2.048 MHz clock, which in turn is used to transmit and receive the up to 32 multiplexed DS0 links.

An added benefit of the invention described herein is that the DS0 FPGA does not need to know the difference between transient induced skews versus a valid frame position adjustment. In either case, the logic will slowly adjust toward the new frame position over the course of multiple frames, while constantly transmitting 8 DS0 bits per frame.

Table I below provides descriptions of the signals referenced above in connection with FIG. 2 and that are further explained in connection with the timing diagrams set forth in the following Figures.

TABLE I

| Signal Name | Description |
|---|---|
| clk19 | 19.44 MHz clock signal sourced by the CSTG and used in conjunction with the sfi_in signal (see below) to define the DS0 frame position. |
| sfi_in | SFI signal sourced by the CSTG; carries an embedded 8 KHz frame position indicator as well as other system control information. |
| sfi_bit_cnt | ANDTM FPGA internal counter; counts from 0 to 2429 for a total of 2430 19.44 MHz bit periods per 8 KHz frame period; count is aligned to the six bit sync pattern (010101) in SFI signal ("sfi_in"). |
| sfi_pntr_extraction_address | Value representing the relative position of the SFI pointer embedded within the SFI signal. This value is stored in the ANDTM FPGA and can be updated by software at any time. When the sfi_bit_cnt is equal to the sfi_pntr_extraction_address, the last 12 sfi_in_bits received will be latched and stored as the new SFI pointer value. Normally, the sfi_pntr_extraction_address value is fixed. |
| frm_19m_position | Current SFI pointer value; indicates where the "lightly filtered" 8 KHz frame position indicator is located relative to the SFI sync pattern. This value is updated each time the sfi_bit_cnt is equal to the sfi_pntr_extraction_address. |
| frm_19m_position_3_clk_pulse | Signal asserted for 3 19.44 MHz clock periods when the sfi_bit_cnt is equal to the frm_19m_position. Three clock periods are needed to ensure that this pulse is latched by the slower 8.192 MHz clock. |
| sfi_pntr_changed | Status indicator that is latched within a status register of the ANDTM FPGA when the current and previous frm_19m_position values are different. |
| sfi_was_early | Status indicator that is latched within a status register of the ANDTM FPGA when the "lightly filtered" system frame position is occurring before the currently generated DS0 frame position. |
| sfi_was_late | Status indicator that is latched within a status register of the ANDTM FPGA when the "lightly filtered" system frame position is occurring after the currently generated DS0 frame position. |
| clk8 | 8.192 MHz clock signal sourced by the BCTM and locked to the 19.44 MHz clock signal and frame using a PLL. The ANDTM divides this clock down to an 2.048 MHz rate to be used in the multiplexed data transfer of 32 DS0 time slots to and from the DIM/DTM (32 time slots* 8 bits * 488 ns – 125 μs). |
| frm_8m | Pulse generated using the frm_9m_position_3_clk_pulse signal representing the expected location of the 0 position of the frm_8m_cnt. If this pulse occurs after or before the frm_8m_cnt is zero, then the sfi_was_late or the sfi_was_early indicator is asserted, respectively. When this occurs, the frm_8m_cnt will be held for an extra clock or advanced by a count of 2 in order to begin realigning the frm_8m_cnt to the new frm_8m_position. |
| frm_8m_cnt | Counter that counts from 0 to 1023 for a total of 1024 8.192 MHz clocks per 8 KHz frame. |
| frm_2m_cnt | Counter that counts from 0 to 255 for a total of 256 2.048 MHz clocks per 8 KHz frame. This counter is generated using the upper 8 bits of the 10 bit frm_8m_cnt counter and is used to shift 32 8 bit DS0 data channels to and from the DIM/DTM. |
| clk2 | 2.048 MHz clock signal used to transmit and receive the 32 multiplexed DS0 channels. This signal is generated using bit 2 of the frm_3m_cnt counter. |
| tma_d_sync_n | Signal asserted when the frm_2m_cnt signal is zero. It is aligned with bit zero of the multiplexed data being sent to the DIM/DTM and also represents the relative 8 KHz frame position of the DS0 data being sent out onto the physical span. |
| tma_d_data_o | Multiplexed DS0 data sent out to the DIM/DTM. This signal carries 32 channels of 8-bit data. Bit zero of channel 0 is aligned to the tma_d_sync_n signal. |
| bit_cnt | Multiplexed data counter within the DIM/DTM FPGA that counts from 0 to 255. |
| tma_d_data_1 | Multiplexed DS0 data received from the DIM/DTM. This signal carries 32 channels of 8-bit data. Bit 1 of channel 0 is aligned to the tma_d_sync_n signal. |
| clk64 | Internal DIM/DTM clock signal used to transmit and receive DS0 data to and from each of the 24 physical DS0 spans (the ANDTM could support 32 spans, but physical space limitations on the DIM/DTM allowed for only 24). |
| byte_clk | Internal DIM/DTM signal that marks the 8 KHz DS0 frame position. It is aligned with bit zero of each DS0 channel |
| dsoa_data (23) | Representative DS0 channel showing the data as it would be transmitted or received at the DIM/DTM physical span interface. |

Figure 3:
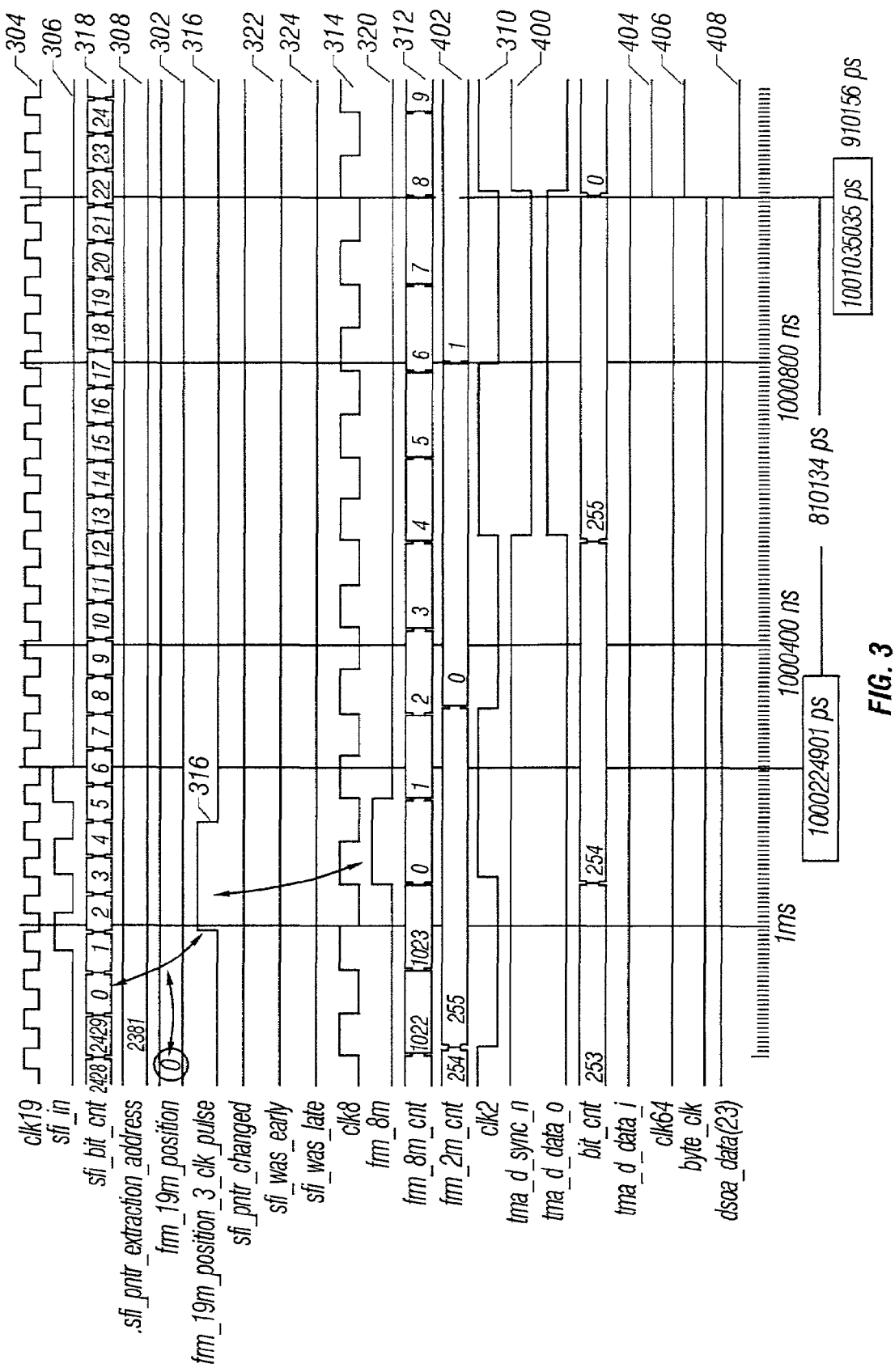
FIGS. 3–8 are timing diagrams illustrating the operation of one embodiment of the present invention for performing DS0 timing source transient compensation.

FIGS. 3–8 are timing diagrams illustrating the operation of one embodiment of the present invention for providing DS0 timing source transient compensation. FIG. 3 illustrates a situation in which no timing source transient compensation is necessary. Referring to FIGS. 2 and 3, in operation, the ANDTM 208 extracts a pointer value ("frm_19m_position"), represented in FIG. 3 by a waveform 302, from the SFI signal ("sfi_in") (waveform 306) received on line 202b at a bit location designated by an SFI pointer extraction address ("sfi_pntr_extraction address") (waveform 308) stored in the FPGA (not shown) of the ANDTM 208. It should be noted that the pointer value may be inserted into the SFI signal ("sfi_in") using the invention described in the above noted related application Ser. No. 10/122,506 entitled "METHOD FOR EMBEDDING A FIRST CLOCK SIGNAL PHASE WITHIN A SECOND SIGNAL", which has been incorporated by reference herein, in which case the pointer frm_19m_position is equivalent to the "CCFPP" described in the related application.

In the example illustrated in FIG. 3, the SFI pointer extraction address is equal to 2381 and the value stored in bit location 2381 is zero; hence, the position of the 8 KHz frame position relative to the SFI sync pattern is zero. In other words, the 8 KHz frame position is aligned with the SFI sync pattern, as expected.

Figure 4:
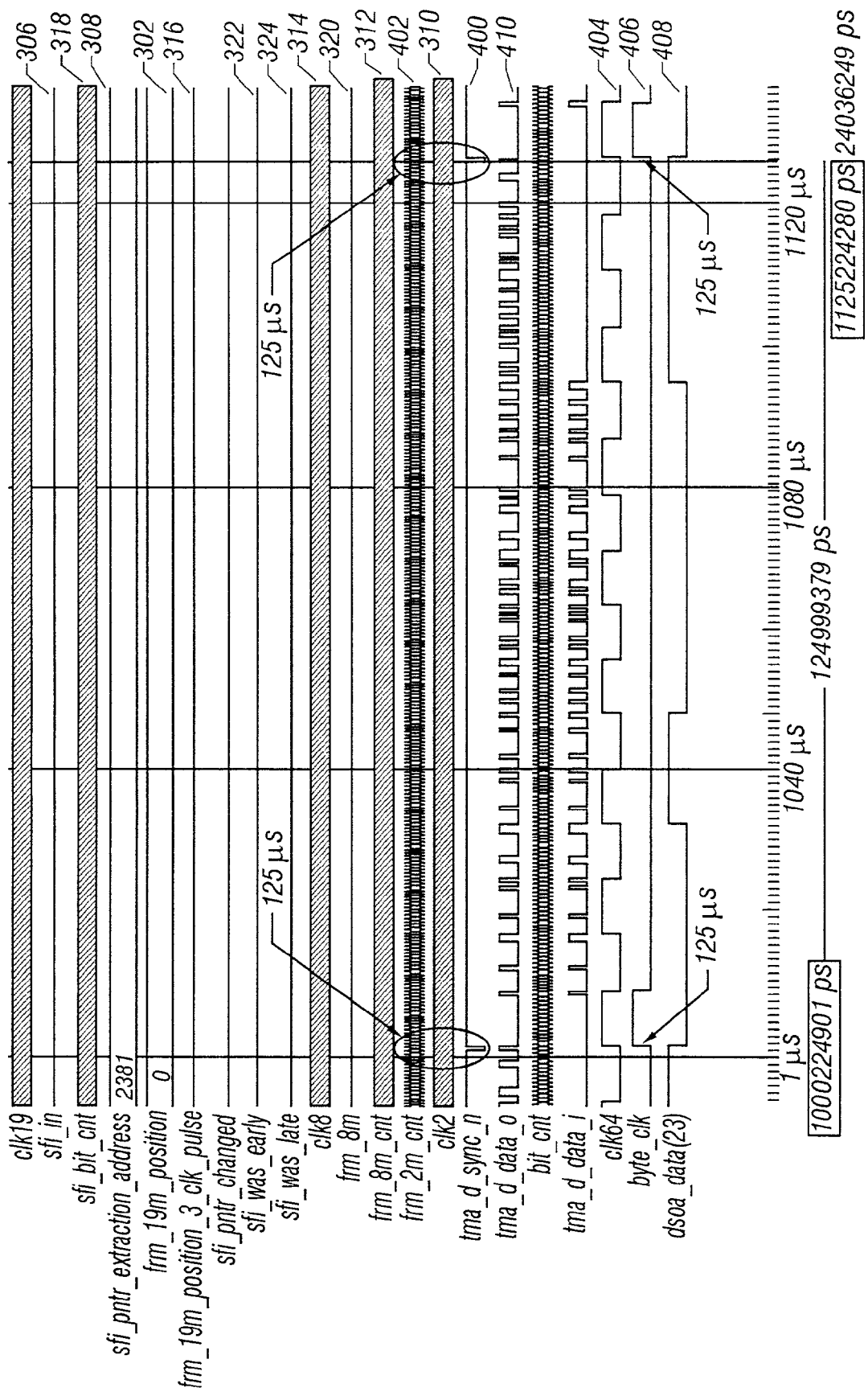

A 2.048 MHz clock signal ("clk2") (waveform 310), which is generated using the inverted value of bit one of the 10-bit, 8.192 MHz counter signal ("frm_8m_cnt") (waveform 312), has a constant period of approximately 488 ns. During normal operation, as illustrated in FIGS. 3 and 4, the frm_8m_cnt counter 312 increments from 0 to 1023 using the 8.192 MHz clock signal ("clk8") (waveform 314) from the BCTM 204. An frm_19m_position_3_clk_pulse pulse (waveform 316), is asserted when the value of the sfi_bit_cnt counter (waveform 318) is equal to the value of the frm_19m_position indicator 302. The frm_19m_position_3_clk_pulse pulse 316 is three clocks wide so that an frm_8pulse (waveform 320) can be created at the 8.192 MHz (i.e., the clk8 signal 314) rate.

When the frm_8m pulse 320 is detected, the value of the frm_8m_cnt counter 312 is verified. If the value of the frm_8m_cnt counter 312 is not zero, then an sfi_was_late indicator (waveform 322) or an sfi_was_early indicator (waveform 324) is asserted as described below. As will be illustrated in detail below with reference to FIGS. 5–8, the assertion of either the sfi_was_late indicator 322 or the sfi_was_early indicator 324 requires that the zero count of the frm_8m_cnt counter 312 begin to shift toward the value of the new frm_19m_position indicator 302.

FIG. 4 is a "zoomed out" illustration of the timing diagram of FIG. 3. As shown in FIG. 4, the value of the extracted frm_19m_position indicator 302 is remaining constant, so that a tma_d_sync_n signal (waveform 400) is being asserted at a constant 125 μs rate. The tma_d_sync_n signal 400 is asserted when the value of the frm_2m_cnt counter (waveform 402) is equal to zero. The value of the frm_2m_cnt counter 402 is created using the upper 8 bits of the value of the frm_8m_cnt counter 312, thus counting from 0 to 255 during each frame period (256 bits at 2.048 MHz). Similarly, the value of the frm_8m_cnt counter 312 increments from 0 to 1023 during each normal frame period (1024 clocks per frame at 8.192 MHz).

The DIM/DTM 210 creates a clk64 signal (waveform 404) and a byte_clk signal (waveform 406) using the tma_d_sync_n signal 400 and the clk2 signal 310. As best illustrated in FIG. 4, a dsoa_data(23) data stream (waveform 408) representing DS0A span number 23, sends 8 bits of data aligned to the clk64 and byte_clk signals 404, 406. In the example illustrated in FIG. 4, the value 0×23 is being transmitted. This data was initially extracted during the previous frame from channel 23 of a tma_d_data_o serial data stream (waveform 410).

Figure 5:
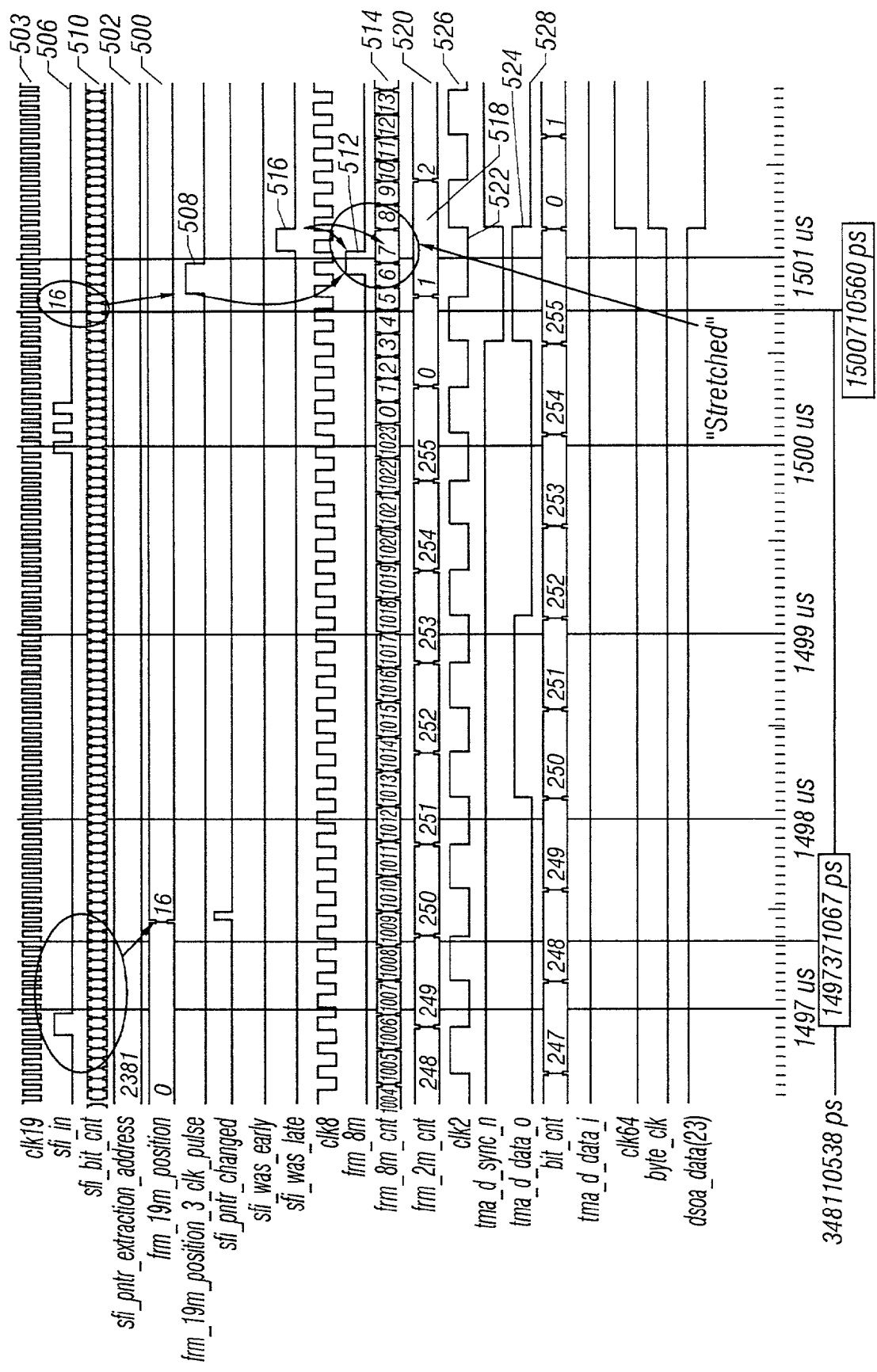

FIG. 5 illustrates a situation in which the value of the SFI pointer ("frm_19m_position") (waveform 500) stored at the bit location indicated by the value of the sfi_pntr_extraction_address (waveform 502) (bit 2381) has changed from 0 to 16. Essentially, this means that the lightly filtered reference signal at the CSTG 200 (i.e., the external clock reference on line 201 (FIG. 2), is now offset from the highly filtered reference by 16 clock pulses at the 19.44 MHz clock ("clk19") (waveform 503) rate. Specifically, the highly filtered reference is aligned with the SFI sync pattern ("010101"), while the position of the lightly filtered reference is offset from the SFI sync pattern by a value represented by the SFI pointer position ("frm_19m_position") 500.

An sfi_pntr_changed pulse (waveform 504) is asserted for one clock to show that the data extracted from the SFI signal ("sfi_in") (waveform 506) at bit position 2381 has changed. The pulse 504 will cause the frm_19_position_3_clk_pulse pulse (waveform 508) to be asserted when the value of the sfi_bit_cnt counter (waveform 510) is 16, rather than 0, as in the example illustrated in FIGS. 3 and 4. Consequently, the frm_8m pulse (waveform 512) moves the same relative amount, causing it to align with a 10-bit form_8m_cnt counter (waveform 514) count of seven (0000000111b), rather than zero.

Because the form_8m pulse 512 occurred at a non-zero count of the frm_8m_cnt counter 514 in which the most significant bit of the 10-bit frm_8m_cnt counter is zero, an sfi_was_late indicator (waveform 516) is asserted for one clock. This results in the count of the frm_8m_cnt counter 514 being held for one extra clock before continuing to increment. This in turn causes a corresponding count 518 of the frm_2m_cnt counter (waveform 520), along with the corresponding states 522, 524, respectively, of the associated clk2 and tma_d_data_o signals (waveforms 526 and 528, respectively), to be "stretched" by one 8.192 MHz clock period. This process will continue once per frame over the course of several frames, until the zero count of the frm_8m_cnt counter 514 has been realigned to the position of the frm_8m pulse 516. The end result is that several DS0A frames will be sent with a total period of 125.122 μs, with one bit per frame having been "stretched" by 122 ns.

Figure 6A:
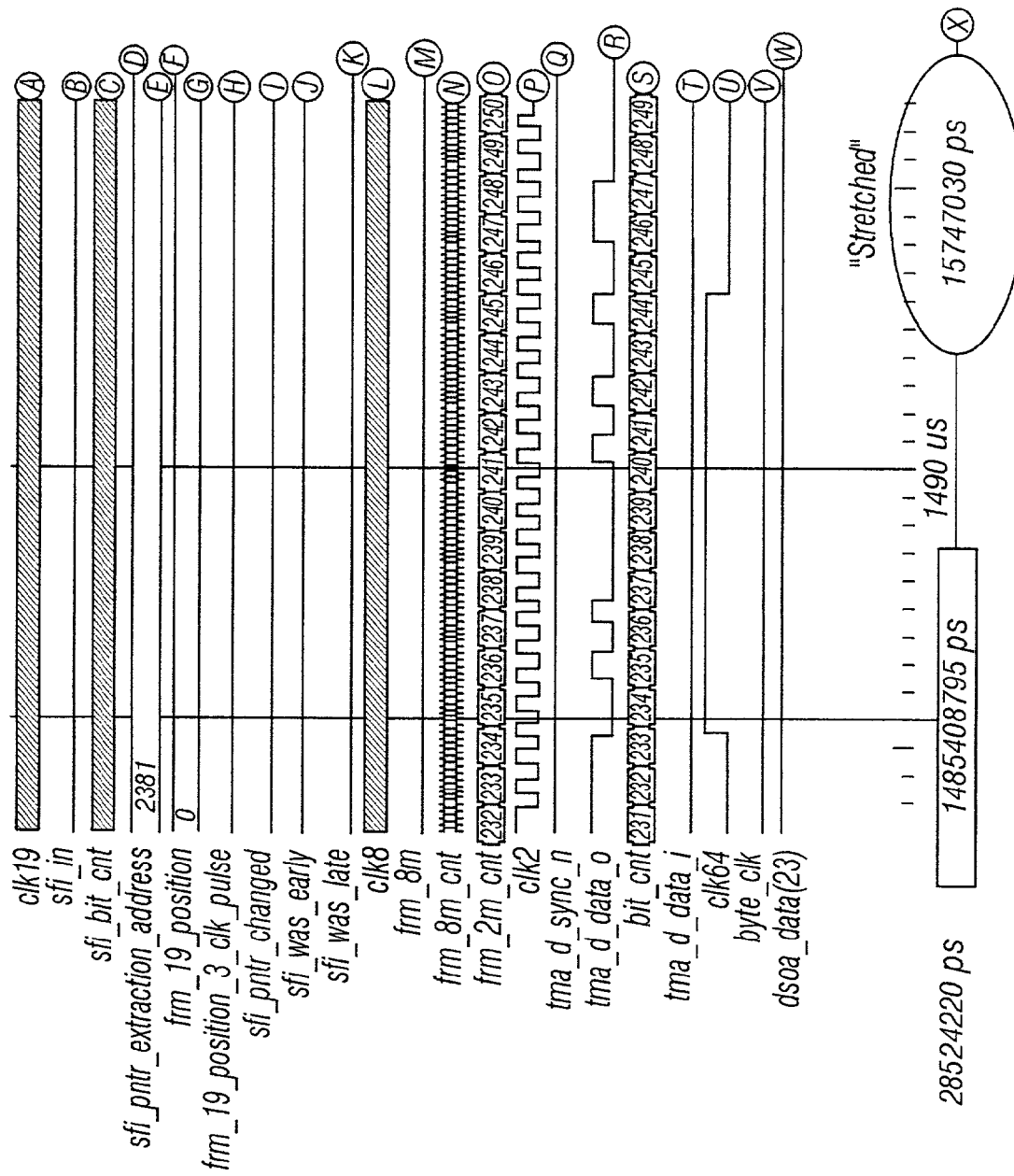
Figure 6B:
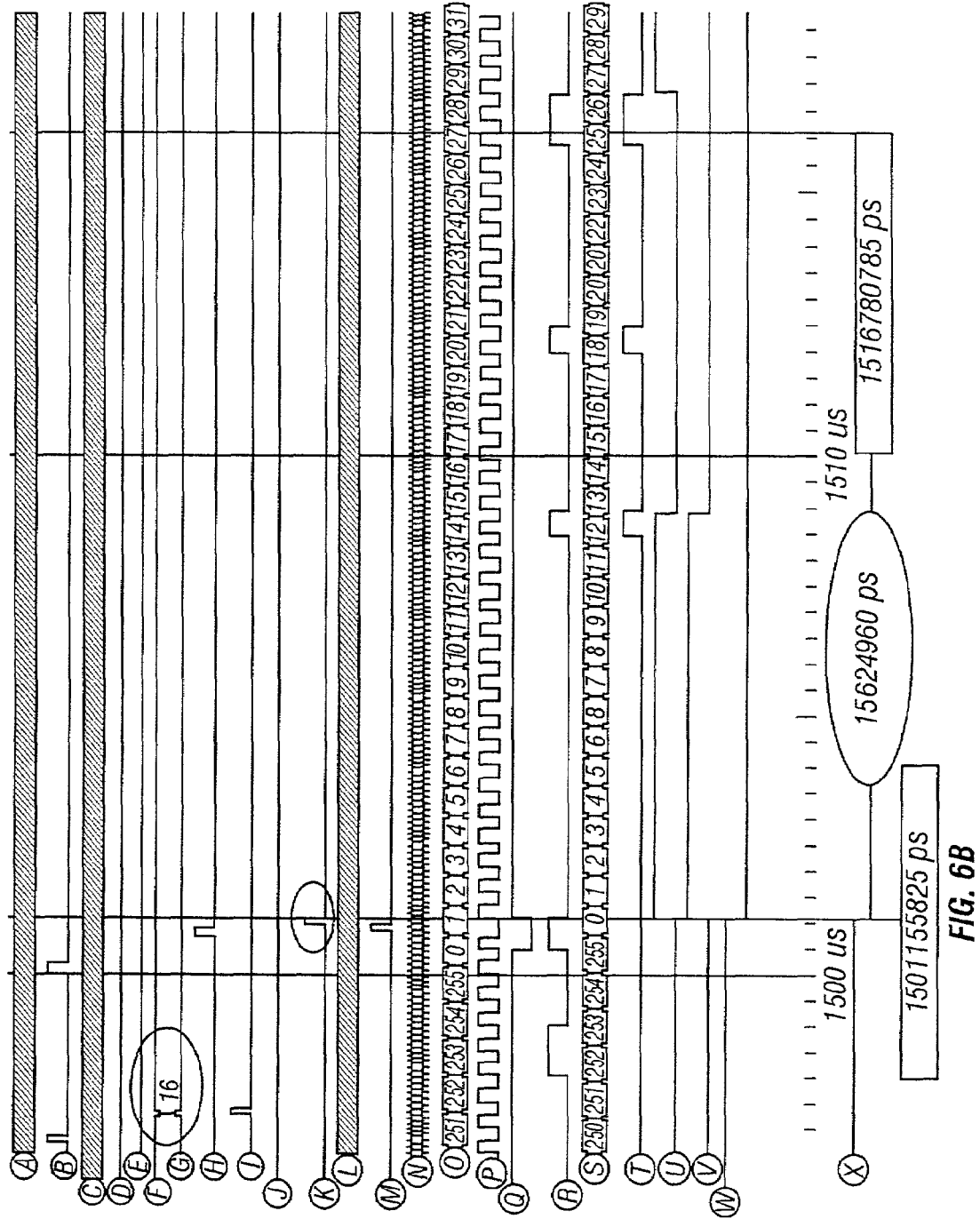

FIGS. 6A and 6B collectively illustrate a "zoomed out" view of the timing diagram of FIG. 5. In particular, FIGS. 6A and 6B illustrate how one DS0 bit is lengthened when the sfi_was_late indicator 516 is asserted.

Figure 7:
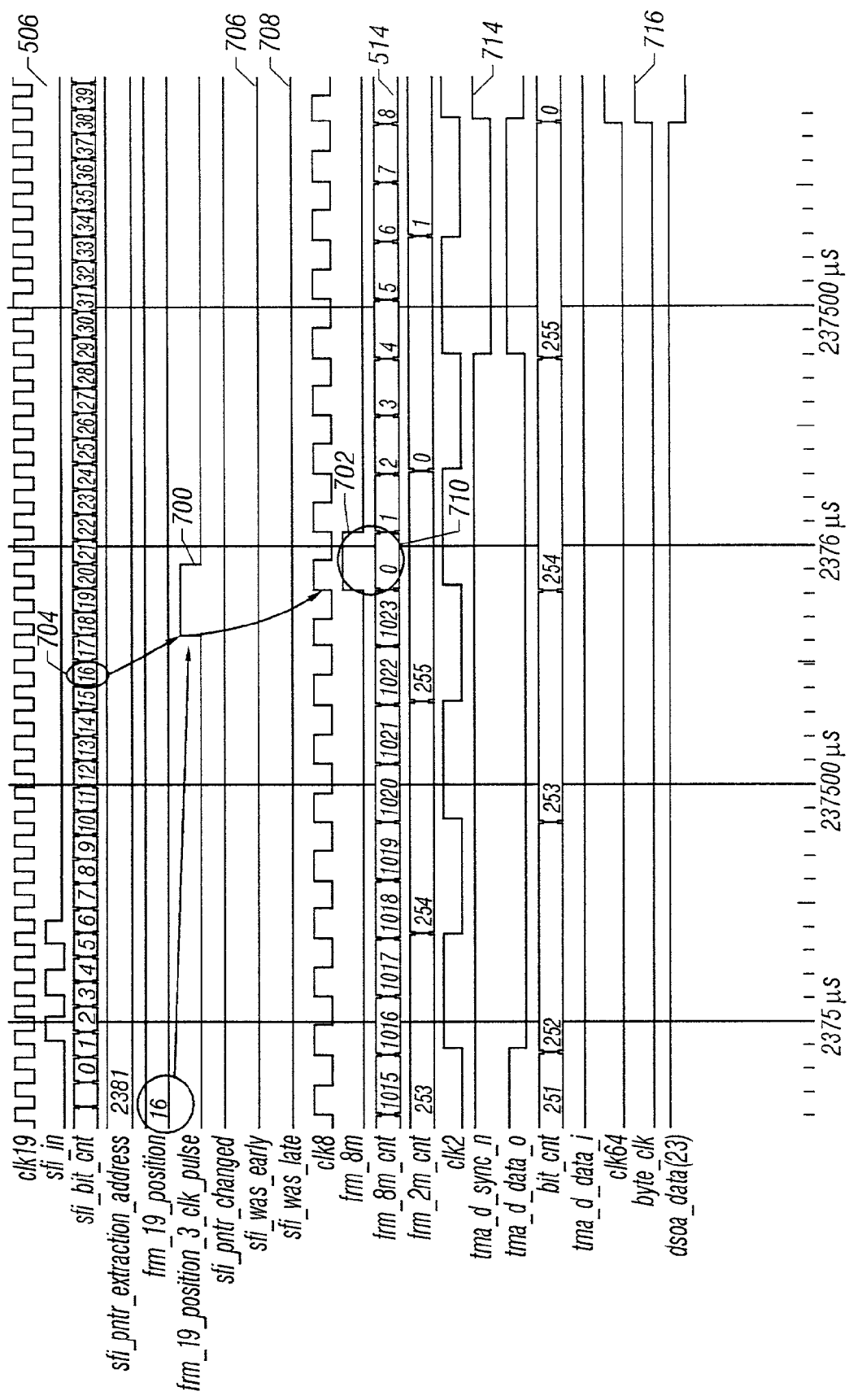

FIG. 7 illustrates the respective new positions of the frm_19m_position_3_clk_pulse (waveform 700) and form_8 pulse (waveform 702) once they have been aligned with an sfi_bit_cnt value of 16 (waveform 704), with some offset due to internal registers. No sfi_was_early or sfi_was_late indicators (waveforms 706 and 708, respectively) are being asserted at this point because the value of the frm_8m_cnt counter 514 has been adjusted such that the zero count 710 thereof is aligned with the frm_8m pulse 702. This means that the tma_d_sync_n and byte_clk signals (waveforms 714 and 716, respectively) are now realigned to the new relative position of the lightly filtered reference.

Figure 8A:
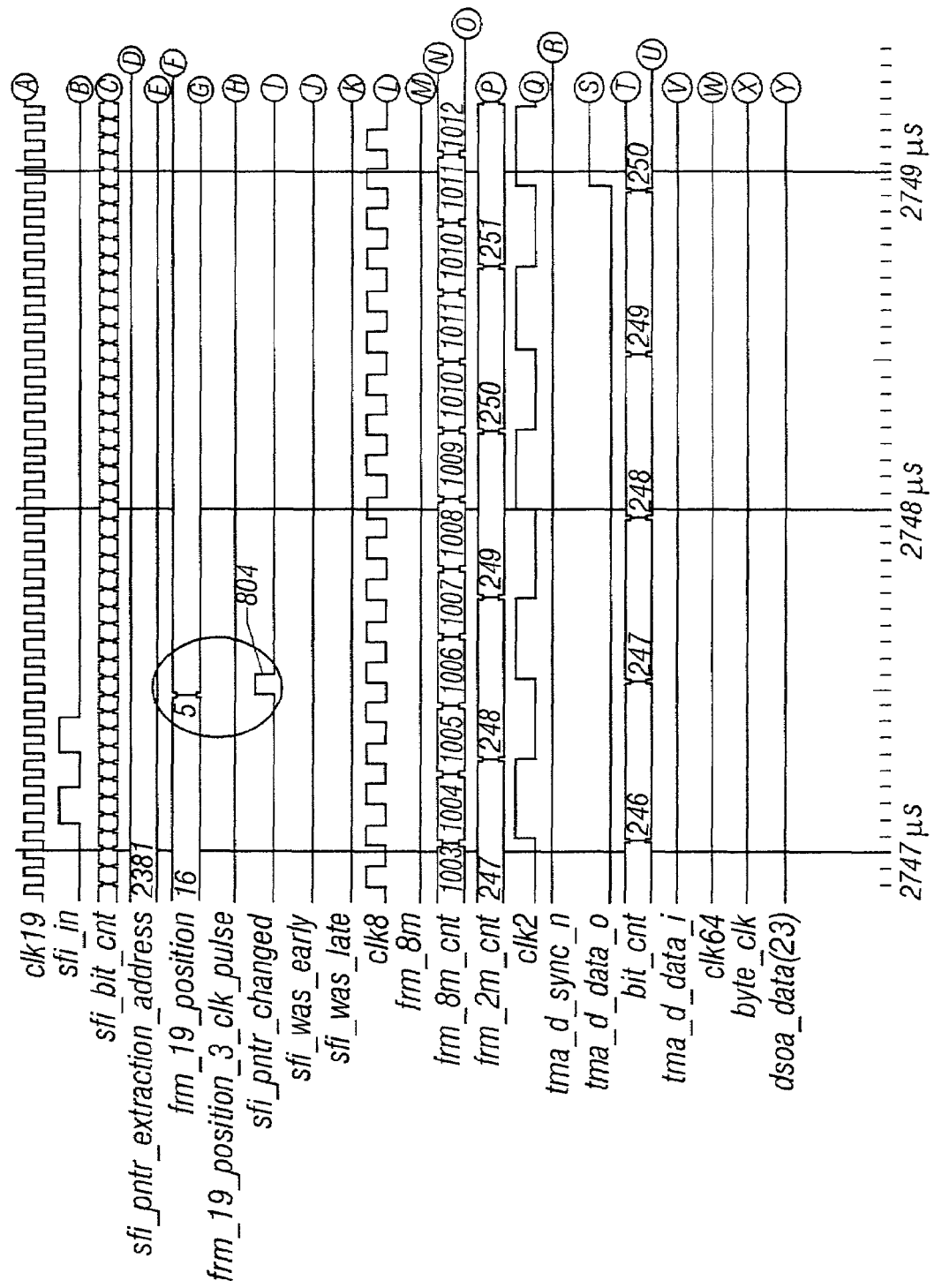
Figure 8B:
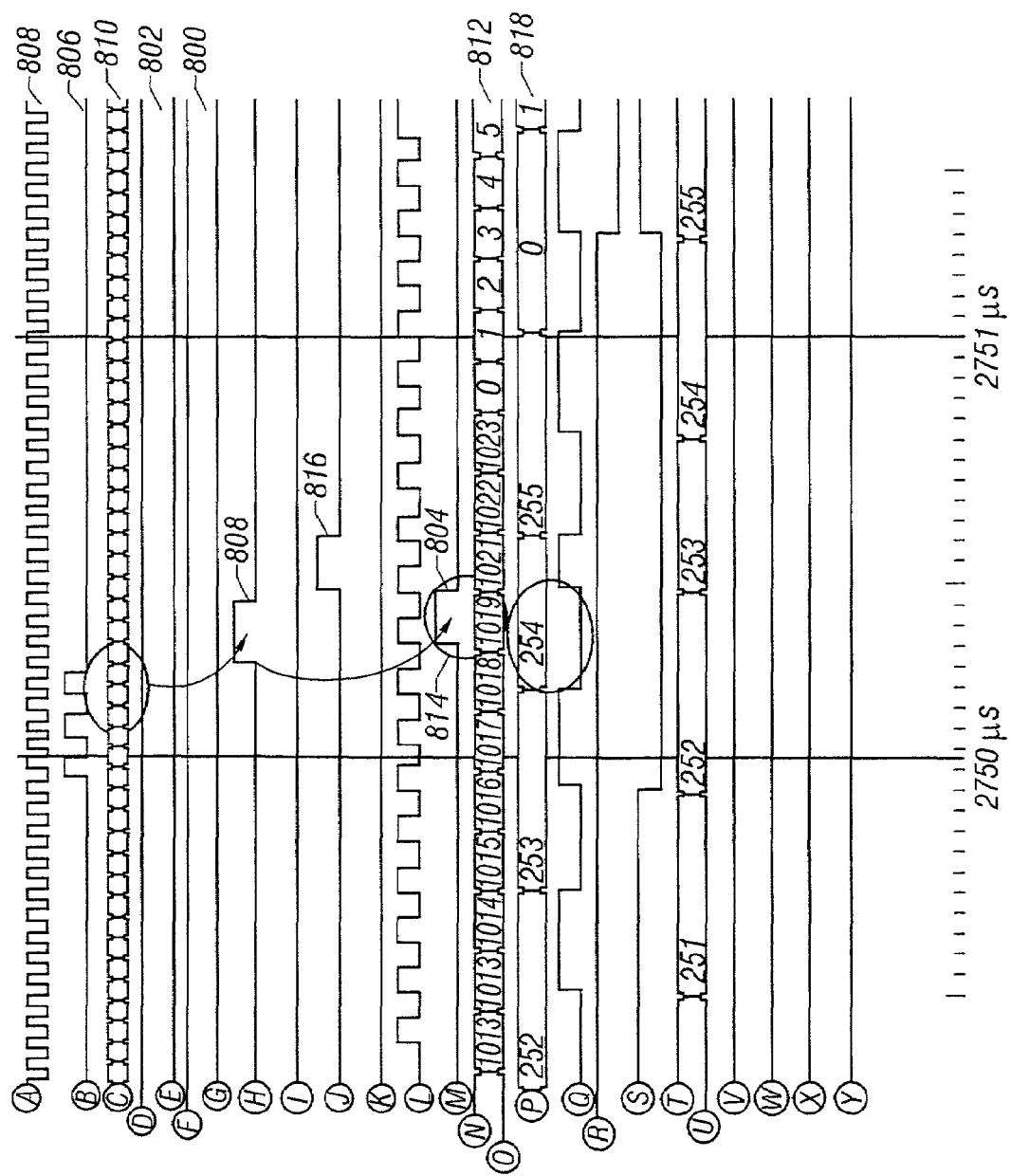

FIGS. 8A and 8B collectively illustrate a situation in which the value of the SFI pointer ("frm_19m_position") (waveform 800) stored at the bit location indicated by the value of the sfi_pntr_extraction_address (waveform 802) (bit 2381) has changed from 16 (as illustrated in FIGS. 5–7) to 5. Essentially, this means that the lightly filtered reference signal at the CSTG 200 is now offset from the highly filtered reference by 5 clock pulses at the 19.44 MHz clock ("clk19") (waveform 803) rate. An sfi_pntr_changed pulse (waveform 804) is asserted for one clock to show that the data extracted from the SFI signal ("sfi_in")(waveform 806) at bit position 2381 has changed. The pulse 804 will cause a frm_19_position_3_clk_pulse pulse (waveform 808) and an frm_8m_pulse (waveform 809) to be asserted when the value of the sfi_bit_cnt counter (waveform 810) is 5, rather than 16, as in the example illustrated in FIGS. 5–7.

The value of the 10-bit frm_8m_cnt counter (waveform 812) is at 1019 (1111111011b) when the frm_8m pulse 809 is asserted, as represented by a circle 814. Because the most significant bit of the 10-bit frm_8m_cnt counter 812 is one, rather than zero, an sfi_was_early indicator (waveform 816) is asserted. This causes the frm_8m cnt counter (waveform 812) to increment by two, rather than one, for one clock (from 1019 to 1021). This in turn causes the value of the frm_2m_cnt counter (waveform 818) of 254 to be shortened by one 8.192 MHz clock period. Ultimately, one of the DS0A bits will be shortened by 122 ns. This process will continue with one bit per frame being shortened until the zero position of the frm_8m_cnt counter 812 has been modified over several frames to align with the frm_8m pulse 809.

Based upon the foregoing Detailed Description, it should be readily apparent that the present invention advantageously provides an innovative and efficient solution for providing DS0 timing source transient compensation. In particular, the present invention provides a means by which to continue the uninterrupted transmission and reception of DS0 traffic after the alignment between the 8.192 MHz and 19.44 MHz clocks have become skewed.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of compensating for timing source transients caused by misalignment of first and second clock signals, the method comprising the steps of:
   monitoring a control signal transmitted using the second clock signal for frame position information for the first clock signal;
   responsive to detection of frame position information, determining whether the first and second clock signals are misaligned; and
   responsive to a determination that the first and second signals are misaligned, periodically temporarily altering one clock period of the first clock signal until the first and second signals are realigned.

2. The method of claim 1 wherein the periodically temporarily altering one clock period comprises the step of stretching the clock period.

3. The method of claim 1 wherein the periodically temporarily altering one clock period comprises the step of contracting the clock period.

4. A method of compensating for timing source transients caused by misalignment of first and second clock signals, the method comprising the steps of:
   monitoring a control signal transmitted using the second clock signal for frame position information for the first clock signal;
   responsive to detection of frame position information, resetting a counter to zero;
   causing the counter to increment using the first clock signal;
   continuing to monitor the control signal for frame position information;
   responsive to each subsequent detection of frame position information:
   determining a value of the counter;
   if the value of the counter is non-zero and the most significant bit ("MSB") of the counter is zero, advancing the value of the counter by more than one count for one clock cycle; and
   if the value of the counter is non-zero and the MSB of the counter is non-zero, holding the value of the counter for at least one clock cycle.

5. The method of claim 4 wherein the counter is a 10-bit counter.

6. The method of claim 4 wherein the first clock signal is an 8.192 MHz clock signal.

7. The method of claim 4 wherein the second clock signal is a 19.44 MHz clock signal.

8. The method of claim 4 wherein the control signal is a serially encoded super frame indicator ("SFI") signal for use in a telecommunications signaling server.

9. The method of claim 4 further comprising the steps of:
   using the second least significant bit of the counter to generate a third clock signal; and
   using the third clock signal to transmit DS0 data to and from a DS0 interface module.

10. The method of claim 4 wherein the frame position information indicates a position of an 8 KHz frame position relative to a sync pattern of the control signal.

11. A system for compensating for timing source transients caused by misalignment of first and second clock signals, the system comprising:
    means for monitoring a control signal transmitted using the second clock signal for frame position information for the first clock signal;
    means responsive to detection of frame position information for resetting a counter to zero;
    means for causing the counter to increment using the first clock signal;
    means for continuing to monitor the control signal for frame position information;
    means responsive to each subsequent detection of frame position information for determining a value of the counter;
    means responsive to a determination that the value of the counter is non-zero and the most significant bit ("MSB") of the counter is zero for advancing the value of the counter by more than one count for one clock cycle; and
    means responsive to a determination that the value of the counter is non-zero and the MSB of the counter is non-zero for holding the value of the counter for at least one clock cycle.

12. The system of claim 11 wherein the first clock signal is an 8.192 MHz clock signal.

13. The system of claim 11 wherein the second clock signal is a 19.44 MHz clock signal.

14. The system of claim 13 wherein the control signal is a serially encoded super frame indicator ("SFI") signal for use in a telecommunications signaling server.

15. The system of claim 13 further comprising:
    means for using the second least significant bit of the counter to generate a third clock signal; and
    means for using the third clock signal to transmit DS0 data to and from a DS0 interface module.

16. The system of claim 13 wherein the counter is a 10-bit counter.

17. The system of claim 13 wherein the frame position information indicates a position of an 8 KHz frame position relative to a sync pattern of the control signal.

18. Apparatus for compensating for timing source transients caused by misalignment of first and second clock signals in a telecommunications signaling server, the apparatus comprising:

logic for monitoring a control signal transmitted using the second clock signal for frame position information for the first clock signal;

a counter connected to the monitoring logic;

logic responsive to detection of frame position information for resetting the counter to zero;

wherein, subsequent to the resetting, the counter increments using the first clock signal;

wherein the monitoring logic continues to monitor the control signal for frame position information; and wherein responsive to each subsequent detection of frame position information by the monitoring logic, the monitoring logic determines a value of the counter and, if the value of the counter is non-zero and the most significant bit ("MSB") of the counter is zero, the value of the counter is advanced by more than one count for one clock cycle, and, if the value of the counter is non-zero and the MSB of the counter is non-zero, the value of the counter is held for at least one clock cycle.

19. The apparatus of claim 18 wherein the first clock signal is an 8.192 MHz clock signal.

20. The apparatus of claim 18 wherein the second clock signal is a 19.44 MHz clock signal.

21. The apparatus of claim 18 wherein the control signal is a serially encoded super frame indicator ("SFI") signal for use in a telecommunications signaling server.

22. The apparatus of claim 18 wherein the third least significant bit of the counter is used to generate a third clock signal used to transmit DS0 data to and from a DS0 interface module.

23. The apparatus of claim 18 wherein the frame position information indicates a position of an 8 KHz frame position relative to a sync pattern of the control signal.

* * * * *